United States Patent [19]

Parkinson et al.

[11] Patent Number: 4,709,966
[45] Date of Patent: Dec. 1, 1987

[54] PROTECTIVE DEVICE

[76] Inventors: James G. Parkinson, Safia Place, Tankfield Paget 6-15, Bermuda; Thomas P. Kirsten, 99 Joao Alvares Soares, CEP 04609, San Paulo, Brazil

[21] Appl. No.: 875,280

[22] Filed: Jun. 17, 1986

[30] Foreign Application Priority Data

Jun. 17, 1985 [BR] Brazil .............................. 6500811[U]

[51] Int. Cl.⁴ ...................... B60R 22/12; A62B 35/00
[52] U.S. Cl. ...................................... 297/473; 297/484
[58] Field of Search ................ 297/483, 484, 485, 473

[56] References Cited

U.S. PATENT DOCUMENTS

| | | | |
|---|---|---|---|
| 1,712,198 | 5/1929 | Clapp | 297/473 |
| 2,726,714 | 12/1955 | McAndrews | 297/473 |
| 2,888,063 | 5/1959 | Rose | 297/473 |
| 3,178,226 | 4/1965 | Cates | 297/484 |
| 3,321,247 | 5/1967 | Dillender | 297/473 X |
| 3,834,758 | 9/1974 | Soule | 297/484 |

FOREIGN PATENT DOCUMENTS 515818 12/1939 United Kingdom ................ 297/484

Primary Examiner—Philip C. Kannan
Attorney, Agent, or Firm—Angelo J. Bufalino

[57] ABSTRACT

A comfortable, safe child restraint seat in which a child is safely secured within the device while providing limited movement of the child within a predetermined area to permit the child to stand up, sit down, or even lie down in the backseat of a vehicle while the vehicle is moving, without compromising the safety of the child. The device includes a plurality of interconnected straps, some of which are adapted to be secured to the seat of the vehicle and some of which are adapted to be positioned around the child to be restrained. The device includes a coupling ring between the respective straps to permit limited movement of the child while the child is effectively restrained by the device.

4 Claims, 2 Drawing Figures

PROTECTIVE DEVICE

BACKGROUND OF THE INVENTION

The present invention relates to a protective device to permit limited movement of a child and at the same time safely restrain the child, when the child is traveling in a vehicle, such as an automobile.

It is generally well known that children, when transported in vehicles, should be placed in the back seats of such vehicles. For this reason, the child should be secured to the back seat of the vehicle to prevent undesired movement of the child within the vehicle, if the vehicle is suddenly stopped or becomes involved in an accident. For example, it is essential that the child be restrained to a seat to prevent the child from being thrown from the vehicle or through a window of the vehicle during a sudden stop or accident.

It is well known to use many diverse methods of securing the child to the back seat of the vehicle. The most common methods include the use of seat belts, either alone, or in combination with various forms of commercially available child restraint seats. The various types of child restraint seats currently available provide limited flexibility for the child restrained therein due to their construction characteristics. Typically, in all child restraint seats currently being used, the child is maintained in a completely seated position, unable to move to another position, often times resulting in a very uncomfortable ride on extended journeys.

The device of the present invention is intended to provide a comfortable, safe child restraint device and eliminate the lack of comfort for children which hamper present child restraint seats. According to the present invention, the child is safely secured within the device, except for limited movement within a predetermined area to permit the child to stand up, sit down, or even lie down in the back seat of the vehicle while the vehicle is moving, without compromising the safety of the child. Unlike prior art devices, the use of this device provides a more comfortable ride for the child with the maximum amount of safety. The device can be manufactured at a relatively low cost.

DESCRIPTION OF THE PREFERRED EMBODIMENT OF THE INVENTION

Figure 1:
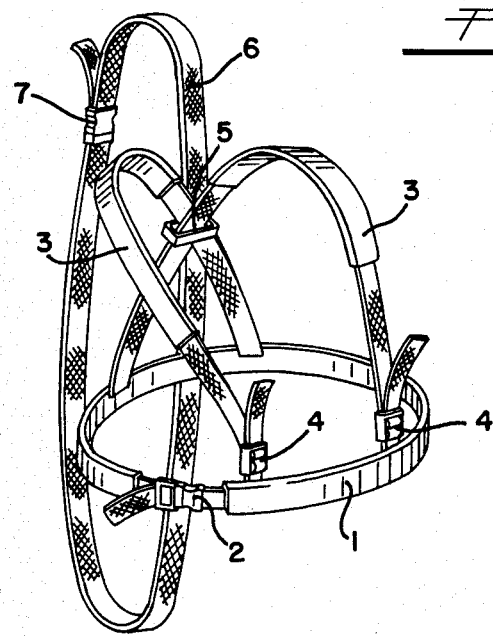
FIG. 1 is a perspective view of the protection device of the present invention.

The protective device of the present invention generally includes a harness having a child encircling belt 1 having a front and a rear portion and adapted to be positioned around the chest or abdomen of the child to be restrained with the device. The belt 1 is positioned under the arms of the child to be restrained. The belt 1 also includes an adjustable buckle 2, for securing the belt around the waist of the child, for example.

The device further includes a pair of shoulder straps or braces 3, each of which has a first and second end respectively affixed to the front and rear portions of the belt 1. The straps 3 are adapted to be positioned over the shoulders of the child to be restrained. The straps 3 are interconnected in crossover relation just above the rear portion of the belt 1 by a single coupling ring or brace 5. Each strap 3 further includes an adjustable buckle 4, each of which is adapted to be connected to the front portion of the belt 1 to restrain the movement of the child.

The device further includes a generally vertically extending anchoring belt 6, which is adapted to be anchored to the back seat of the vehicle to prevent movement of the belt 6 with respect to the seat. The anchoring belt 6 includes a buckle 7 to securely tighten the belt 6 around the perimeter of the upright portion of the vehicle seat. The belt 6 is positioned within the coupling ring 5 in operative engagement with the straps 3 to permit the straps 3 to move with respect to the fixed anchoring belt 6. The connection between of the straps 3 and the belt 6 through the ring 5 will permit free movement of the straps 3 (and belt 1 connected thereto) with respect to the belt 6, thereby allowing limited movement for the child restrained by the device without compromising the safety of the child.

Figure 2:
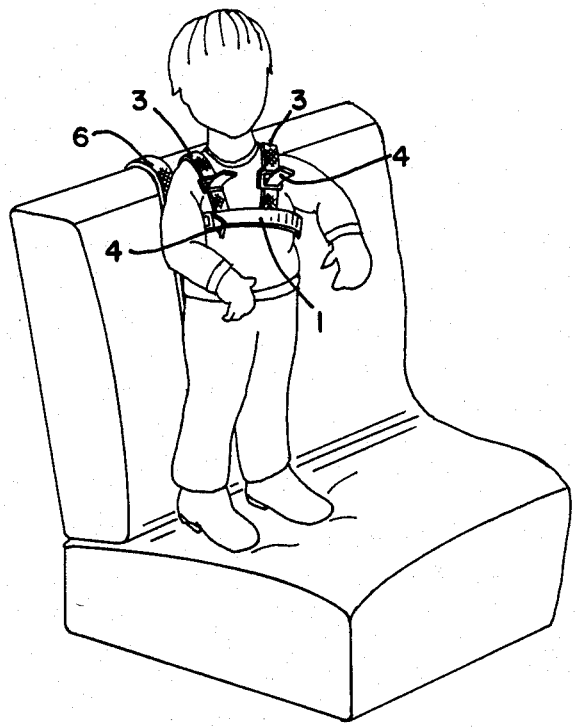
FIG. 2 is a perspective view of the protection device of the present invention showing a child in a standing position being restrained by the protective device.

In use, the belt 1 is positioned around the waist of the child and tightly secured to the child by the buckle 2. The straps 3 are positioned over the shoulders of the child (as shown in FIG. 2) and secured to the belt 1 through the strap buckles 4. Once the child is positioned within the harness, the anchoring belt 6 is secured around the perimeter of upper portion of the back seat as shown in FIG. 2 and secured to such seat by tightening the buckle 7.

The child restrained will then be free to move along the longitudinal axis of the anchoring belt 6 to permit the child to stand on the seat as shown in FIG. 2 or to sit (not shown) or even lie down on the seat (not shown).

Once the belt 6 has been anchored to the seat, the child may be easily removed from the protective device by simply manipulating the buckle 2 on the belt 1. To insure maximum safety for the child, the belt 6 should be secured in the center section of the upright back seat, away from the doors, so that the child cannot reach door handles, locks, windows, etc.

While the invention has been described with reference to its preferred embodiment, it will be understood by those skilled in the art that various changes may be made and equivalents may be substituted for the elements thereof without departing from the spirit of the invention or the scope of the appended claims. In addition, modifications to the specifics will occur to those skilled in the art. Therefore, it is intended that the invention not be limited to the particular embodiment disclosed as the best mode contemplated for carrying out this invention, but that the invention will include all embodiments falling within the scope of the appended claims.

We claim:

1. A protective device for providing limited movement of a child traveling in a vehicle comprising
    a seat anchoring belt assembly having a generally vertically extending closed loop, said loop being adapted to encircle a portion of the seat of the vehicle to prevent movement of said belt relative to the seat;
    said belt operatively engaging a child restraining harness adapted to be positioned around the upper torso of a child, said harness including a single child encircling belt assembly and a shoulder strap assembly;

said child encircling belt assembly having a front portion and a rear portion and extending circumferentially about the chest or abdomen of the child and beneath the arms of the child;

said shoulder strap assembly including a pair of straps, each of said straps including a first and second end respectively affixed to said front and rear portions of said belt assembly;

said shoulder straps being arranged in crossover relation such that the right rear and the left front portions of said belt are connected by one of said shoulder harness straps and the right front and the left rear portions of said belt are connected by the other of said shoulder harness straps;

said pair of shoulder straps arranged in crossover relation being free to separately move in a longitudinal direction with respect to each other;

a single free-floating coupling ring receiving and positioning respectively portions of said seat anchoring belt and said shoulder harness strap assembly to permit limited movement of said child restraining harness with respect to said anchoring belt thereby permitting limited movement of the child restrained within said device; and said coupling ring securing said shoulder straps in said crossover relation while at the same time permitting said longitudinal movement of said straps with respect to each other.

2. The protective device of claim 1 wherein said seat anchoring belt assembly is adjustable.

3. The protective device of claim 1 wherein said child encircling belt assembly is adjustable.

4. The protective device of claim 1 wherein said shoulder strap assembly is adjustable.

* * * * *